United States Patent [19]
Yasuda et al.

[11] Patent Number: 5,648,307
[45] Date of Patent: Jul. 15, 1997

[54] METHOD FOR PRODUCTION OF GAS DIFFUSION ELECTRODE

[75] Inventors: Kazuaki Yasuda; Minoru Mizuhata; Keisuke Oguro; Hiroyasu Takenaka, all of Ikeda, Japan

[73] Assignee: Agency of Industrial Science and Technology, Ministry of International Trade and Industry, Tokyo, Japan

[21] Appl. No.: 566,156

[22] Filed: Dec. 1, 1995

[30] Foreign Application Priority Data

Dec. 5, 1994 [JP] Japan .................. 6-330241

[51] Int. Cl.$^6$ ............................... H01M 4/88
[52] U.S. Cl. ............................................ 502/101
[58] Field of Search ............... 502/101; 427/115, 427/125; 429/42

[56] References Cited

U.S. PATENT DOCUMENTS

| | | | |
|---|---|---|---|
| 4,009,305 | 2/1977 | Fujimaki | 427/399 |
| 4,816,289 | 3/1989 | Komatsu | 423/447.3 |
| 5,084,144 | 1/1992 | Reddy et al. | 205/104 |
| 5,190,813 | 3/1993 | Ohashi | 428/319.3 |
| 5,538,585 | 7/1996 | Wakita | 156/308.2 |

FOREIGN PATENT DOCUMENTS

| | | |
|---|---|---|
| 56-62545 | 5/1981 | Japan . |
| 56-155645 | 12/1981 | Japan . |
| 57-152479 | 9/1982 | Japan . |
| 61-1869 | 1/1986 | Japan . |
| 4-95355 | 7/1990 | Japan . |
| 5-343073 | 12/1993 | Japan . |

*Primary Examiner*—John Niebling
*Assistant Examiner*—Brendan Mee
*Attorney, Agent, or Firm*—Oblon, Spivak, McClelland, Maier & Neustadt, P.C.

[57] ABSTRACT

A method for the production of a gas diffusion electrode having particles of a platinum group metal deposited on a carbon sheet is disclosed. This method comprises placing a water-repelling carbon sheet into contact with ozone, thereby oxidizing the surface of the sheet and forming a functional group on the surface, then immersing the sheet in a solution containing platinum group metal complex cations as dissolved seeds, thereby inducing ion exchange between the hydrogen ions present in the functional group and the platinum group metal complex cations and deposition of the platinum group metal complex cations on the carbon sheet, and further reducing the platinum group metal complex cations on the carbon into platinum group metal particles.

5 Claims, 1 Drawing Sheet

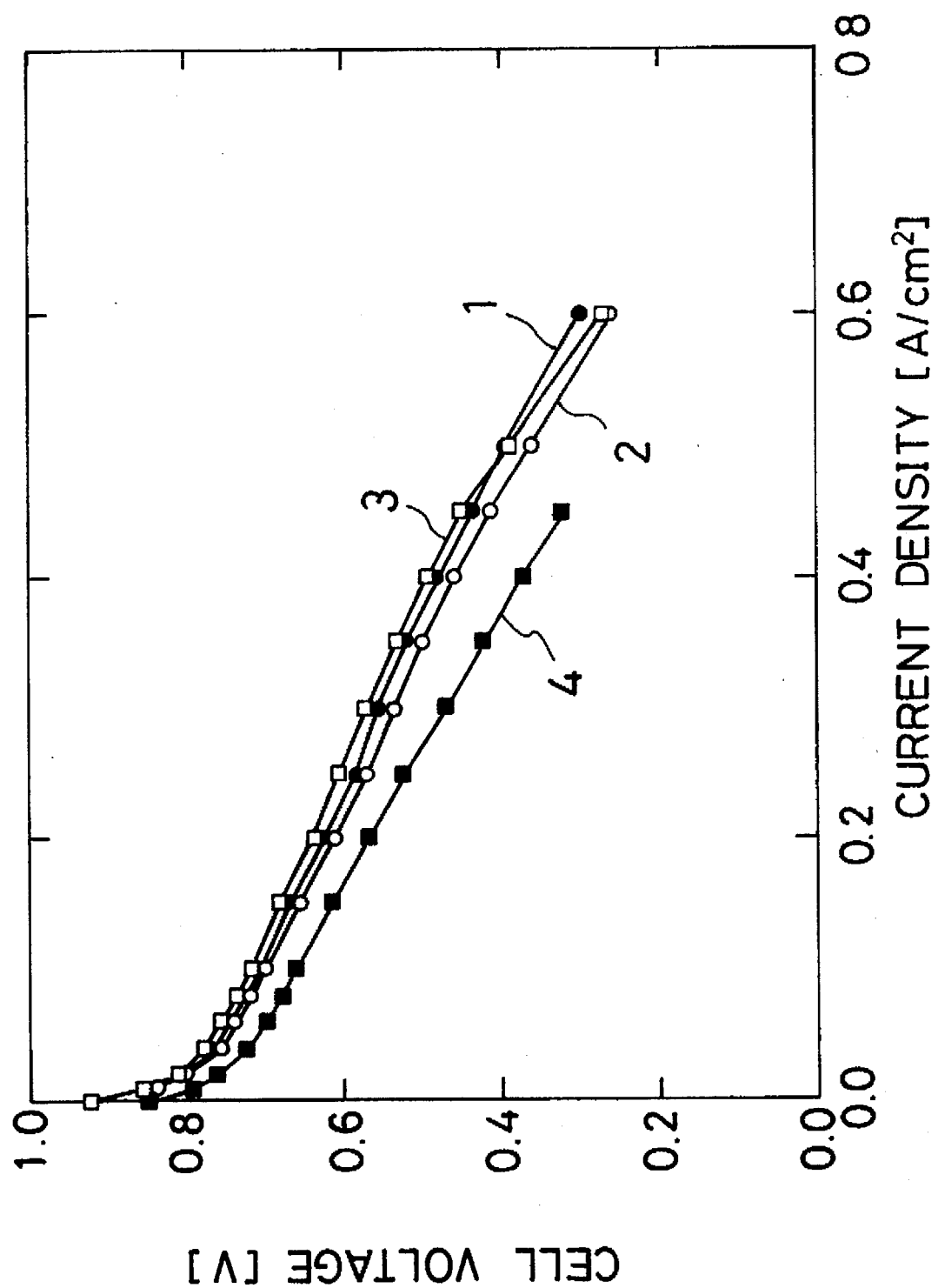

METHOD FOR PRODUCTION OF GAS DIFFUSION ELECTRODE

BACKGROUND OF THE INVENTION

1. Field of the Invention

This invention relates to a method for the production of a gas diffusion electrode. More particularly, this invention relates to a method for the production of a gas diffusion electrode having a platinum group metal deposited thereon by means of an ion-exchange reaction.

2. Description of the Prior Art

Fuel cells of the phosphoric acid type, the solid polymer type, and the like use a gas diffusion electrode having particles of a precious metal such as platinum dispersed on an electroconductive carbon support. In the case of fuel cells of the solid polymer type, there is a particularly strong need for a technology for depositing fine particles of platinum in a highly dispersed state so as to increase the catalyst surface area and obtain an electrode exhibiting high catalytic activity with only a small amount of deposited catalytic metal. As means for obtaining a gas diffusion electrode for a fuel cell having fine platinum particles of a diameter of not more than 3 nm deposited as a catalyst in a highly dispersed state, a method which resides in causing colloidal particles of an oxide of platinum to be deposited on carbon particles (JP-B-61-1,869), a method using a protective colloiding agent (JP-A-56-155,645), and the like have been proposed. These methods adopt a procedure which comprises depositing platinum on a carbon powder, then mixing the platinum-deposited carbon powder with a dispersion of polytetrafluoroethylene (PTFE), and subsequently sheet molding the resultant mixture. The molded sheet thus obtained possesses a water-repelling property. These methods are problematic, however, in the point that, during the sheet molding, the platinum particles agglomerate and lose their catalytic ability or are covered with the carbon particles, PTFE, etc. and prevented from contacting the reaction gas and functioning as a catalyst. As a result, the utilization ratio of catalyst is degraded.

For overcoming this problem, a method which comprises preparatorily forming a sheet electrode possessing a water-repelling property and then impregnating the sheet electrode with, for example, an alcohol solution of chloroplatinic acid (JP-A-05-343,073) has been proposed. With this method, however, it is difficult to attain uniform impregnation of the alcohol solution in the sheet electrode, and the platinum particles are not deposited in a highly dispersed state, because the platinum particles gradually agglomerate.

From the practical point of view, therefore, a strong need is felt for the development of a method enabling easy production of a gas diffusion electrode having particles of a platinum group metal deposited in a highly dispersed state thereon and, at the same time, excelling in catalytic activity.

SUMMARY OF THE INVENTION

In light of these problems of the prior art, the inventors continued studies with a view to responding to this need. As a result, they found that a platinum group metal-deposited gas diffusion electrode with excellent catalytic activity is obtained by placing a water-repelling carbon carrier formed in the shape of sheet in a stream of ozone gas, thereby forming an acidic functional group on the surface of carbon, then immersing the carbon support having the acidic functional group in a solution containing platinum group metal complex cations as dissolved seeds, thereby inducing deposition of the platinum group metal complex cations on the surface of the carbon support by virtue of ion exchange of hydrogen ions present in the functional group on the surface of carbon with the platinum group metal complex cations, and subjecting the resultant processed carbon support to reduction.

Specifically, this invention provides a method for the production of a gas diffusion electrode having particles of a platinum group metal deposited on a carbon sheet, which method comprises placing a water-repelling carbon sheet into contact with ozone thereby oxidizing the surface of the sheet and forming a functional group on the surface, then immersing the sheet in a solution containing platinum group metal complex cations as dissolved seeds, thereby inducing ion exchange between the hydrogen ions present in the functional group and the platinum group metal complex cations and deposition of the platinum group metal complex cations on the carbon sheet, and further reducing the platinum group metal complex cations on the carbon into platinum group metal particles.

BRIEF EXPLANATION OF THE DRAWING

The single drawing is a diagram based on test results showing the properties of solid polymer type fuel cells using gas diffusion electrodes which were obtained in Examples 1, 2, and 3 and Comparative Example 1.

DESCRIPTION OF THE PREFERRED EMBODIMENT

When the surface of a carbon sheet is subjected to an oxidizing treatment, such functional groups as carboxyl group (—COOH), phenol group (—OH), and ketone group (>C=O) are formed at the terminals of graphite structures formed of C—C bonds. Among these, the carboxyl group has a particularly easily dissociable hydrogen ion ($H^+$) at the terminal thereof and serves to impart relatively strong acidity to the surface. By causing ion exchange between the hydrogen ions present in these functional groups and platinum group metal complex cations and then reducing the platinum group metal ion, minute particles of the platinum group metal can be stoichiometrically fixed on the carbon surface and enabled to function as a catalyst. By this method, the catalyst particles can be uniformly dispersed in the form of minute particles in the carbon sheet.

Means available for effecting the oxidizing treatment of the carbon surface include liquid-phase methods using a strongly oxidative aqueous solution such as aqueous potassium permanganate solution or aqueous nitric acid solution and vapor-phase methods using an oxidative gas such as oxygen or ozone. When the liquid-phase method is adopted for the oxidizing treatment of a carbon sheet having a water-repelling property, however, this property hinders the infiltration of the solution to the core of the sheet. When the vapor-phase method using oxygen is adopted for the treatment, the temperature of the site of reaction must be elevated to a level in the approximate range of 350° to 400° C. When the carbon sheet uses polytetrafluoroethylene (PTFE), which is the most practical binder for imparting a water-repelling property to the carbon sheet, the PTFE is inevitably decomposed at the elevated temperature. For these reasons, this invention contemplates performing the oxidizing treatment of the carbon sheet with ozone gas because the treatment with ozone gas can be implemented at normal room temperature without use of an aqueous solution.

In the method of this invention for the production of a gas diffusion electrode, the water-repelling carbon sheet used as a support for the platinum group metal is not particularly defined. One practical example of the carbon sheet can be produced by sheet molding a carbon powder such as of acetylene black incorporating as a binder therein a fluorine contained resin powder such as PTFE at a concentration in the approximate range of 20 to 40% by weight and sintering the molded sheet at a temperature in the approximate range of 320° to 380° C., thereby giving rise to a sintered sheet having a thickness in the approximate range of 20 to 200 µm. Various other methods of producing the water-repelling carbon sheet are also available.

Next, the water-repelling carbon sheet is set in place in ozone gas, preferably in a stream of ozone gas, thereby effecting an oxidizing treatment of the carbon sheet and forming such acidic groups as —COOH, —OH, and >C=O at the terminals of graphite structures forming the carbon sheet. The treatment with the ozone gas is initiated by placing the carbon sheet in a vessel made of a material such as glass, or PTFE which is not corroded by ozone and introducing the ozone gas into the vessel through a corrosion-resistant pipe. Appropriately, the ozone gas is diluted with an inert gas or an oxygen gas to a concentration in the approximate range of 150 to 300 $g/m^3$ in the product of dilution. The reaction proceeds even when the carbon sheet is simply left standing in ozone gas. Advantageously, however, the treatment is performed in a stream of ozone gas having a flow volume in the range of 100 to 200 $cm^3/min$. For the purpose of preventing the carbon sheet from being decomposed or deformed by a protracted treatment, the duration of the treatment is preferably in the approximate range of 30 to 120 minutes.

The method of this invention uses a water-repelling carbon sheet. The most favorable method for the production of the water-repelling carbon sheet has been already described. Otherwise, the water-repelling carbon sheet can be produced by sheet molding carbon black and fluorinating the surface of the molded sheet. The water repellency of the sheet can be rated based on the angle of contact formed by a water drop placed on the sheet surface. For the sake of this invention, the angle of contact is appropriately not less than 90°.

Then, the water-repelling carbon sheet which has undergone the oxidizing treatment is immersed in the solution of a platinum group metal complex. In this case, since an aqueous solution of the platinum group metal complex does not easily permeate the carbon sheet treated in advance to acquire necessary water repellency, the carbon sheet is advantageously wetted in advance with an organic solvent. The organic solvent used for this purpose is preferably one which exhibits only a weak reducing force to the platinum group metal, such as a lower alcohol (e.g., methanol or ethanol) or acetone.

The solution of a platinum group metal complex for the immersion of the carbon sheet is a solution containing a platinum group metal ion complex salt as the source of dissolved seeds. In consequence of this treatment of immersion, the cations such as hydrogen ions of the functional group present in the sheet are caused to undergo ion exchange with the platinum group metal cation complex and consequently deposited on the carbon sheet. Concrete examples of the platinum group metal cation complex salt advantageously usable herein include tetrammine platinum (II) chloride ($[Pt(NH_3)_4]Cl_2$) and hexammine platinum (IV) chloride ($[Pt(NH_3)_6]Cl_4$).

Then, the carbon sheet having platinum group metal complex cations deposited thereon in consequence of the ion exchange is dried and reduced in the presence of a reducing agent, for example, in an ambience of hydrogen, or with a sodium boron hydride solution. During the reducing reaction in hydrogen, the reducing gas may undergo a violent reaction with the platinum group metal complex ions, depending on the amount of the platinum group metal deposited on the carbon sheet. Under such circumstances, the reduction is preferably carried out in a stream of a mixed gas produced by diluting hydrogen gas with such an inert gas as nitrogen or argon. Practically, the mixing ratio of the two gases, i.e. hydrogen/inert gas, by volume is in the range of 3/7 to 9/1. Generally, the preferable temperature of the reducing reaction is in the approximate range of 100° to 200° C. The carbon sheet which has undergone the reducing treatment is cooled to normal room temperature under an ambience of an inert gas such as nitrogen or argon.

When sodium boron hydride is used as the reducing agent, the platinum group metal complex cations are reduced by preparing an aqueous solution containing sodium boron hydride at a concentration in the approximate range of 1.5 to 5% by weight and stirring the cations in the aqueous solution to induce the required reaction for a period in the range of 30 minutes to one hour. In this case, the water-repelling carbon sheet is preferably wetted in advance with an organic solvent because the solution must be allowed to permeate the gas diffusion electrode which is formed of the water-repelling carbon sheet. The organic solvent used for this purpose is preferably one which exhibits only a weak reducing strength to platinum group metal, such as a lower alcohol (for example, methnol or ethanol) or acetone.

The platinum group metal catalyst which is formed by the procedure described above is deposited on the carbon support as dispersed uniformly in the form of particles having a diameter of about 1 nm.

Although Pt is the most practical platinum group metal, Pd, Ru, Rh, and Ir are also advantageously usable. Alloys of these platinum group metals may be used instead.

The gas diffusion electrode according to this invention has platinum group metal particles deposited on the carbon sheet as dispersed uniformly and enjoys an excellent catalytic activity. It is, therefore, capable of notably improving the properties of ordinary fuel cells such as phosphoric acid type fuel cells and solid polymer type fuel cells which need a platinum type highly active catalyst.

EXAMPLES

Now, this invention will be described more specifically below with reference to working examples, a comparative example, and a test. It should be understood that this invention is not limited to these working examples or the test.

Example 1

An electrode sheet formed of a sintered mixture of polytetrafluoroethylene (PTFE) and carbon (PTFE content= 30% by weight) and measuring 1.0 mm in thickness and 36.5 mm in diameter was placed in a glass vessel and treated therein for one hour by introducing into the glass vessel ozone gas of a concentration of 220 to 250 $g/m^3$ at a flow volume of 170 $cm^3$/minute at normal room temperature.

Then, this electrode sheet was kept immersed for four hours at normal room temperature in an aqueous solution of tetrammine platinum (II) chloride ($[Pt(NH_3)_4]Cl_2$) containing platinum at a concentration of 10 g/liter to effect ion exchange and induce the deposition of platinum on the sheet. The sheet was then washed with distilled water, dried, and reduced in a stream of hydrogen at 180° C. Consequently, a gas diffusion electrode having platinum particles (having a diameter of about 1 nm) deposited on the surface of carbon was obtained. The platinum particles were uniformly distributed at a density of 0.09 mg/cm$^2$.

Example 2

An electrode sheet formed of a sintered mixture of polytetrafluoroethylene (PTFE) and carbon (PTFE content= 30% by weight) and measuring 1.0 mm in thickness and 36.5 mm in diameter was placed in a glass vessel and treated therein for one hour by introducing into the glass vessel ozone gas of a concentration of 220 to 250 g/m$^3$ at a flow volume of 170 cm$^3$/minute at normal room temperature.

Then, this electrode sheet was kept immersed for four hours at normal room temperature in an aqueous solution of tetrammine platinum (II) chloride ([Pt(NH$_3$)$_4$]Cl$_2$) containing platinum at a concentration of 10 g/liter to effect ion exchange and induce the deposition of platinum on the sheet. The sheet was then washed with distilled water, dried, and subjected to a reducing treatment for 30 minutes in an aqueous 1.5 wt % sodium boron hydride solution. Consequently, a gas diffusion electrode having platinum particles (having a diameter of about 1 nm) deposited on the surface of carbon was obtained. The platinum particles were uniformly distributed at a density of 0.1 mg/cm$^2$.

Example 3

An electrode sheet formed of a sintered mixture of polytetrafluoroethylene (PTFE) and carbon (PTFE content= 30% by weight) and measuring 1.0 mm in thickness and 36.5 mm in diameter was placed in a glass vessel and treated therein for one hour by introducing into the glass vessel ozone gas of a concentration of 220 to 250 g/m$^3$ at a flow volume of 170 cm$^3$/minute at normal room temperature.

Then, this electrode sheet was kept immersed for four hours at normal room temperature in an aqueous solution of a mixture of tetrammine platinum (II) chloride ([Pt(NH$_3$)$_4$]Cl$_2$) containing platinum at a concentration of 10 g/liter with ruthenium chloride containing ruthenium at a concentration of 10 g/liter to effect ion exchange and induce the deposition of platinum on the sheet. The sheet was then washed with distilled water, dried, and reduced in a stream of hydrogen at 180° C. Consequently, a gas diffusion electrode having platinum particles (having a diameter of about 1 nm) deposited on the surface of carbon was obtained. The platinum particles were uniformly distributed at a density of 0.09 mg/cm$^2$.

Comparative Example 1

A gas diffusion electrode was produced by following the conventional procedure, specifically by diluting chloroplatinic acid with ethanol to a platinum concentration of 1 g/liter, impregnating the same carbon sheet as used in Example 1 with the resultant solution, and subjecting the processed carbon sheet to a reducing treatment with hydrogen in the same manner as in Example 1.

Test:

The gas diffusion electrodes obtained in Examples 1, 2, and 3 and Comparative Example 1 were molded. To the surface of each molded electrode, a solution containing perfluorosulfonic acid (produced by Aldrich Chemical Corp. and marketed as "Nafion") at a concentration of 5% by weight was applied at the rate of 0.01 ml/cm$^2$. The applied layer of the solution was vacuum dried at normal room temperature.

Then, the Nafion solution-applied side of the molded electrode and a film (50 µm in thickness) formed of a proton electroconductive polymer electrolyte (produced by DuPont Company and marketed as "Nafion 112") were pressed against each other and then hot pressed at 160° C. under 7 MPa for one minute to manufacture a composite of the gas diffusion electrode and the proton electroconductive film.

This composite was incorporated in a cell having an electrode area of 10 cm$^2$ and tested for power generation under the following conditions by feeding a stream of hydrogen to one of the electrodes and a stream of oxygen to the other electrode. The operating conditions were 100% of hydrogen, one atmosphere, and 80° C. on the fuel electrode side and 100% of oxygen, one atmosphere, and 80° C. on the air electrode side.

The properties of the fuel electrodes using the electrodes of Examples 1, 2, and 3 and Comparative Example 1 are shown collectively in FIG. 1. In the graph, the curves 1, 2, and 3 represent the data obtained of Examples 1, 2, and 3 and the curve 4 the data obtained of Comparative Example 1

The diagram clearly indicates that the gas diffusion electrodes according to this invention possess excellent properties.

What is claimed is:

1. A method for the production of a gas diffusion electrode having particles of a platinum group metal deposited on a carbon particles-containing carrier formed in the shape of a sheet, which method comprises oxidizing the surface of a water-repelling carbon particles containing carrier formed in the shape of a sheet with ozone, thereby oxidizing the surface of said sheet and forming a functional group on said surface, then immersing said sheet in a solution containing dissolved platinum group metal complex cations, ion exchanging the hydrogen ions present in said functional group and said platinum group metal complex cations and depositing said platinum group metal complex cations on said carbon sheet, and further reducing said platinum group metal complex cations on the carbon into platinum group metal particles.

2. The method according to claim 1, wherein said water-repelling carbon sheet is a carbon sheet containing a fluorine containing resin at a concentration in the range of 20 to 40% by weight.

3. The method according to claim 1, wherein said ozone with which said carbon sheet is brought into contact is diluted with one member selected from the group consisting of inert gases and oxygen gas at a concentration in the approximate range of 150 to 300 g/m$^3$.

4. The method according to claim 1, wherein said platinum group metal is at least one member selected from the group consisting of platinum, palladium, ruthenium, rhodium, and iridium.

5. The method according to claim 1, wherein the reduction of said platinum group metal complex cation uses sodium boron hydride as a reducing agent.

* * * * *